US008612203B2

(12) United States Patent
Foster et al.

(10) Patent No.: US 8,612,203 B2
(45) Date of Patent: Dec. 17, 2013

(54) STATISTICAL MACHINE TRANSLATION ADAPTED TO CONTEXT

(75) Inventors: George Foster, Ottawa (CA); Roland Kuhn, Ottawa (CA)

(73) Assignee: National Research Council of Canada

( * ) Notice: Subject to any disclaimer, the term of this patent is extended or adjusted under 35 U.S.C. 154(b) by 1306 days.

(21) Appl. No.: 11/922,311

(22) PCT Filed: Jun. 16, 2006

(86) PCT No.: PCT/CA2006/001004
§ 371 (c)(1),
(2), (4) Date: Dec. 17, 2007

(87) PCT Pub. No.: WO2006/133571
PCT Pub. Date: Dec. 21, 2006

(65) Prior Publication Data
US 2009/0083023 A1      Mar. 26, 2009

Related U.S. Application Data

(60) Provisional application No. 60/691,238, filed on Jun. 17, 2005.

(51) Int. Cl.
G06F 17/28      (2006.01)
(52) U.S. Cl.
USPC ........................................ 704/2; 704/3; 704/4
(58) Field of Classification Search
None
See application file for complete search history.

(56) References Cited

U.S. PATENT DOCUMENTS

| | | | |
|---|---|---|---|
| 5,477,451 A | 12/1995 | Brown et al. | |
| 5,497,319 A | 3/1996 | Chong et al. | |
| 5,510,981 A | 4/1996 | Berger et al. | |
| 5,535,120 A | 7/1996 | Chong et al. | |
| 5,768,603 A | 6/1998 | Brown et al. | |
| 5,805,832 A | 9/1998 | Brown et al. | |
| 5,867,811 A * | 2/1999 | O'Donoghue | 704/1 |
| 5,991,710 A | 11/1999 | Papineni et al. | |
| 6,085,162 A * | 7/2000 | Cherny | 704/277 |
| 6,092,034 A | 7/2000 | McCarley et al. | |
| 6,182,026 B1 * | 1/2001 | Tillmann et al. | 704/2 |
| 6,195,631 B1 * | 2/2001 | Alshawi et al. | 704/4 |
| 6,236,958 B1 * | 5/2001 | Lange et al. | 704/8 |
| 6,278,967 B1 * | 8/2001 | Akers et al. | 704/2 |
| 6,598,015 B1 | 7/2003 | Peterson et al. | |
| 2002/0009322 A1 | 1/2002 | Shih et al. | |
| 2002/0040292 A1 | 4/2002 | Marcu | |
| 2002/0107683 A1 | 8/2002 | Eisele | |

(Continued)

OTHER PUBLICATIONS

Lee et al. "A Multilingual Text Mining Approach Based on Self-Organizing Maps". Applied Intelligence 18, 295-310, 2003.*

(Continued)

*Primary Examiner* — Jesse Pullias
(74) *Attorney, Agent, or Firm* — Jason Davis

(57) ABSTRACT

This invention relates to a means and a method for translating source text into a target text where the context information is taken into consideration. A source text unit is defined around a translation unit which is to be translated. This source text unit is mapped onto a bilingual sublanguage space where the bilingual sublanguage space comprises a source sublanguage space and mappings to the target language. The translation is adapted to the source text unit, thereby considering contextual information.

20 Claims, 5 Drawing Sheets example of decoding in the continuous space

(56) References Cited

U.S. PATENT DOCUMENTS

| | | |
|---|---|---|
| 2002/0123877 A1 | 9/2002 | Xun |
| 2002/0188439 A1 | 12/2002 | Marcu |
| 2003/0009322 A1 | 1/2003 | Marcu |
| 2003/0154071 A1* | 8/2003 | Shreve .............................. 704/9 |
| 2003/0208354 A1 | 11/2003 | Lin et al. |
| 2003/0233222 A1 | 12/2003 | Soricut et al. |
| 2004/0024581 A1 | 2/2004 | Koehn et al. |
| 2004/0030551 A1 | 2/2004 | Marcu |
| 2004/0102956 A1 | 5/2004 | Levin |
| 2004/0260532 A1 | 12/2004 | Richardson et al. |
| 2005/0021322 A1 | 1/2005 | Richardson et al. |
| 2005/0033567 A1 | 2/2005 | Sukehiro |
| 2005/0038643 A1 | 2/2005 | Koehn |

OTHER PUBLICATIONS

Brown, Ralf. "Automated Generalization of Translation Examples". Proceedings of the 18th conference on Computational linguistics—vol. 1, 2000.*

Mathieu et al. "Multilingual Document Clusters Discovery". Recherche d'Information Assistee par Ordinateur (RIAO) Proceedings, Apr. 26-28, 2004, 1-10.*

Nepveu et al., Adaptive Language and Translation Models for Interactive Machine Translation, EMNLP 2004, Barcelona, Spain, (2004).

Zhao et al., Lanugage Model Adaptation for Statistical Machine Translation with Structured Query Models, Coling, Geneva (2004).

Lagarda et al. Meeting of Transtype 2 0 European Project, Nov. 7-8, 2002 Valencia, Spain.

* cited by examiner

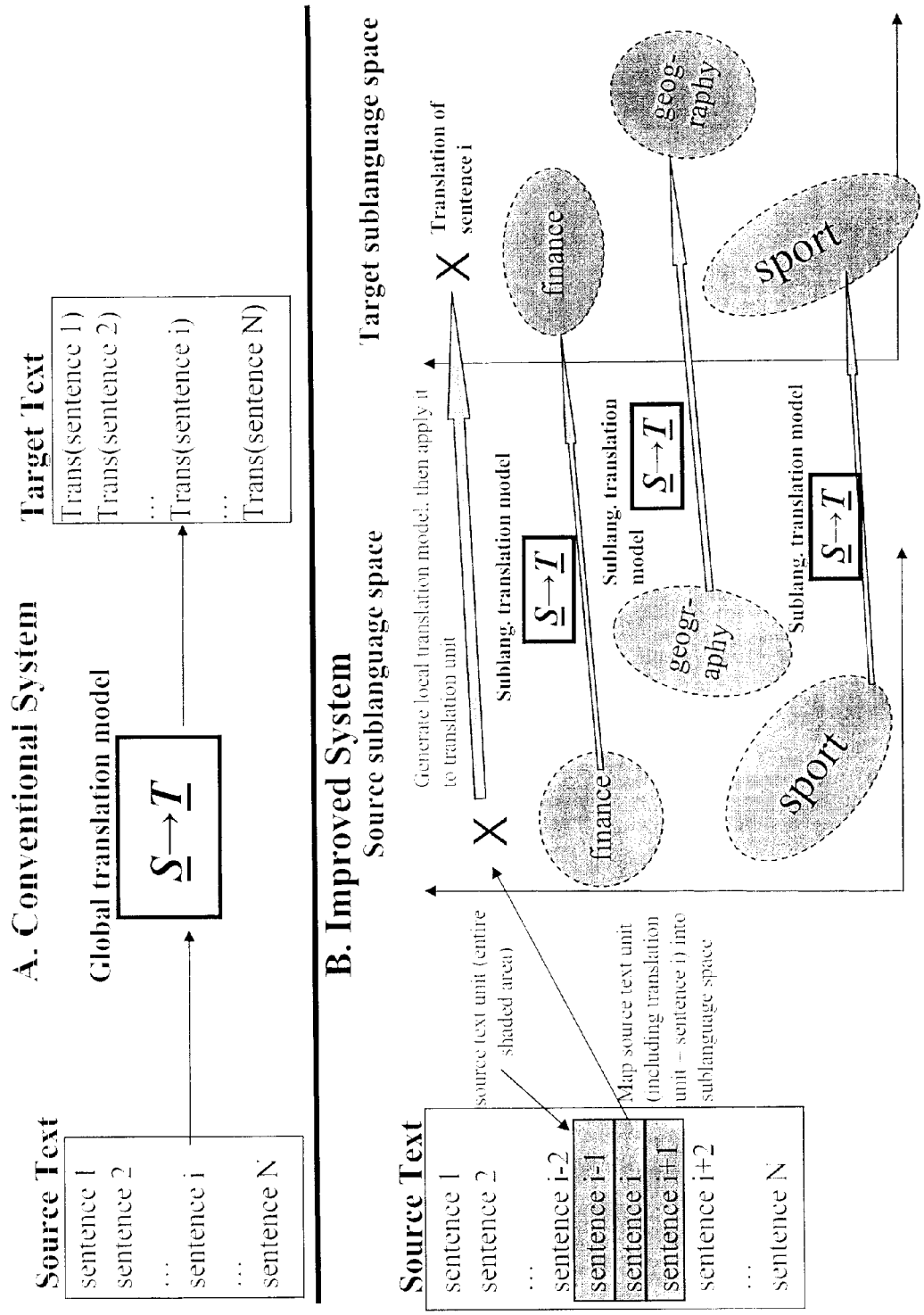

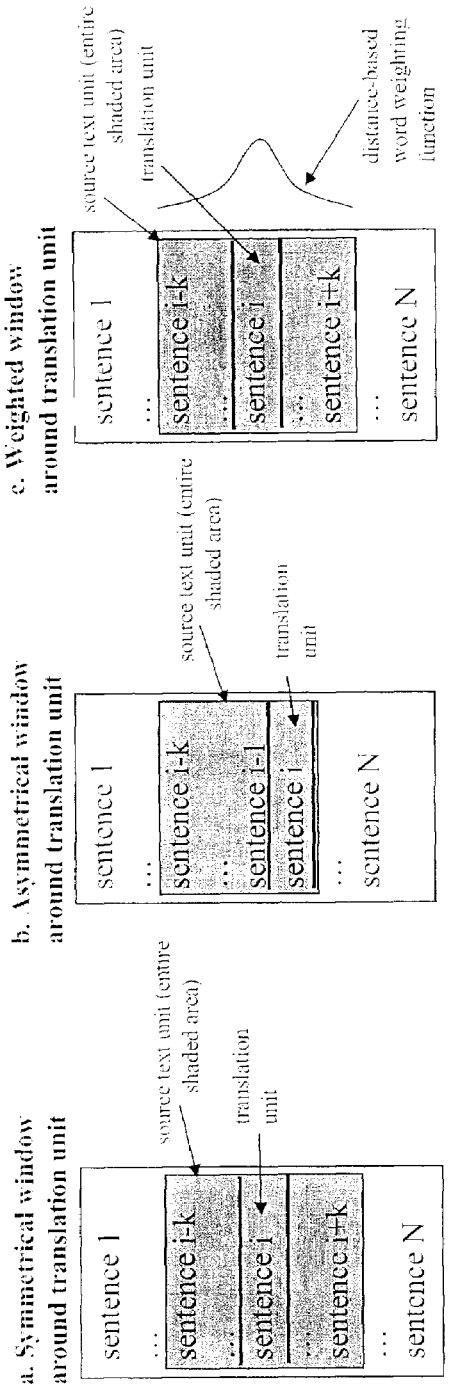
Figure 2: some ways of defining the source text unit in a source file
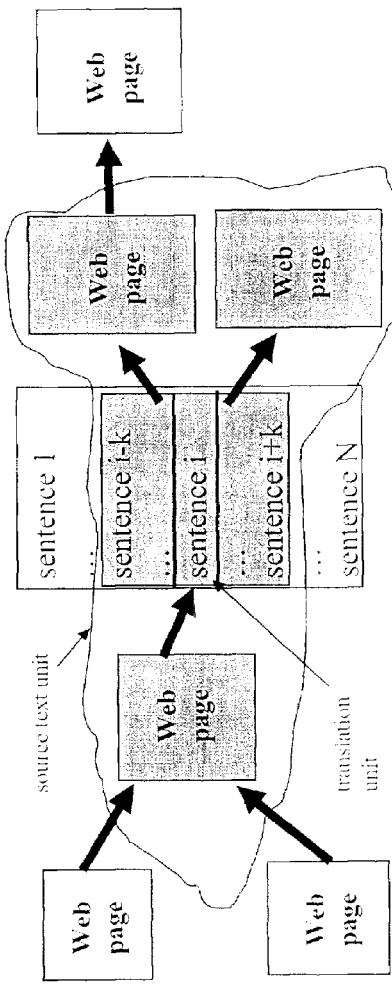
Figure 3: defining the source text unit for a web page

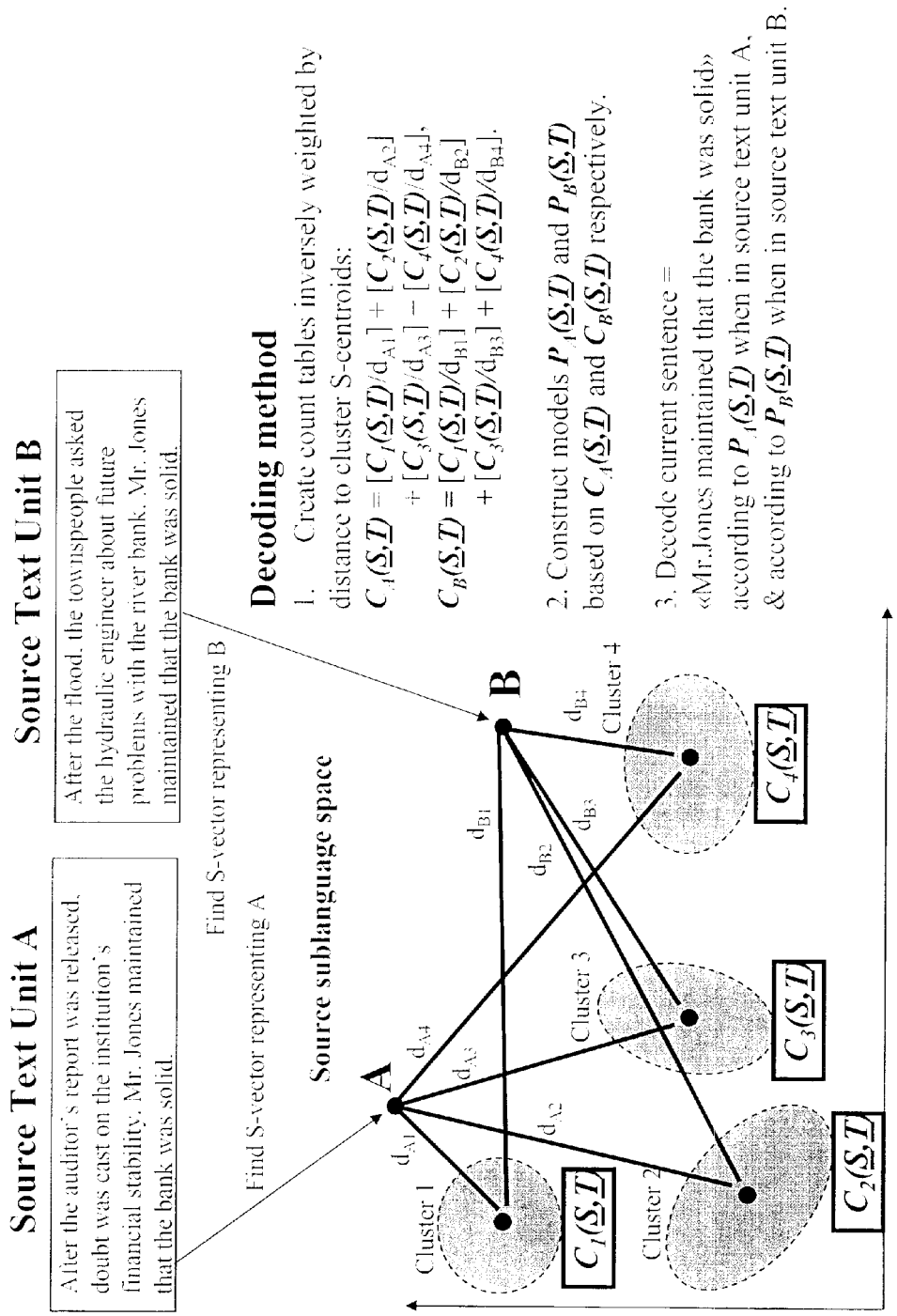
Figure 4: example of decoding in the continuous space

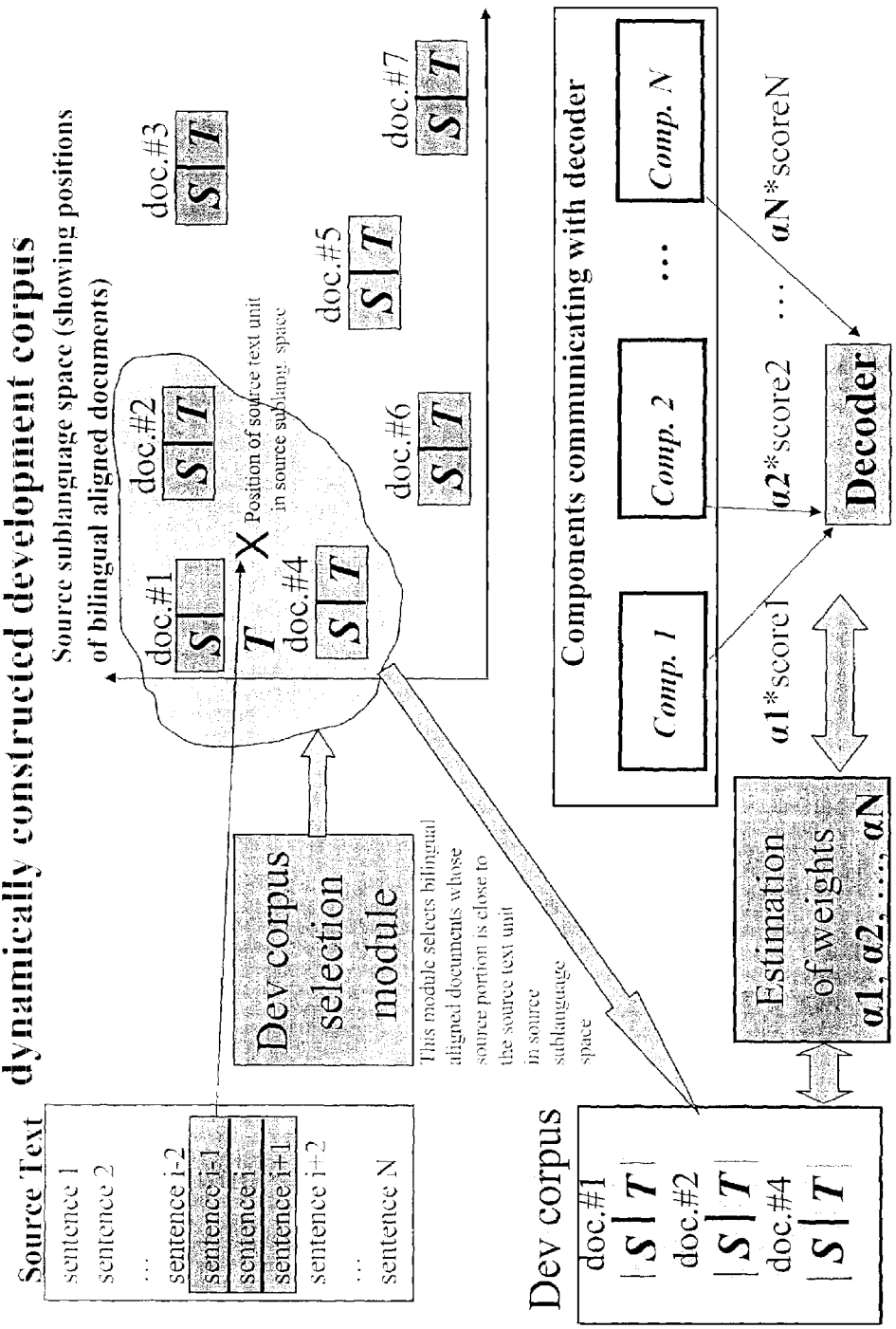

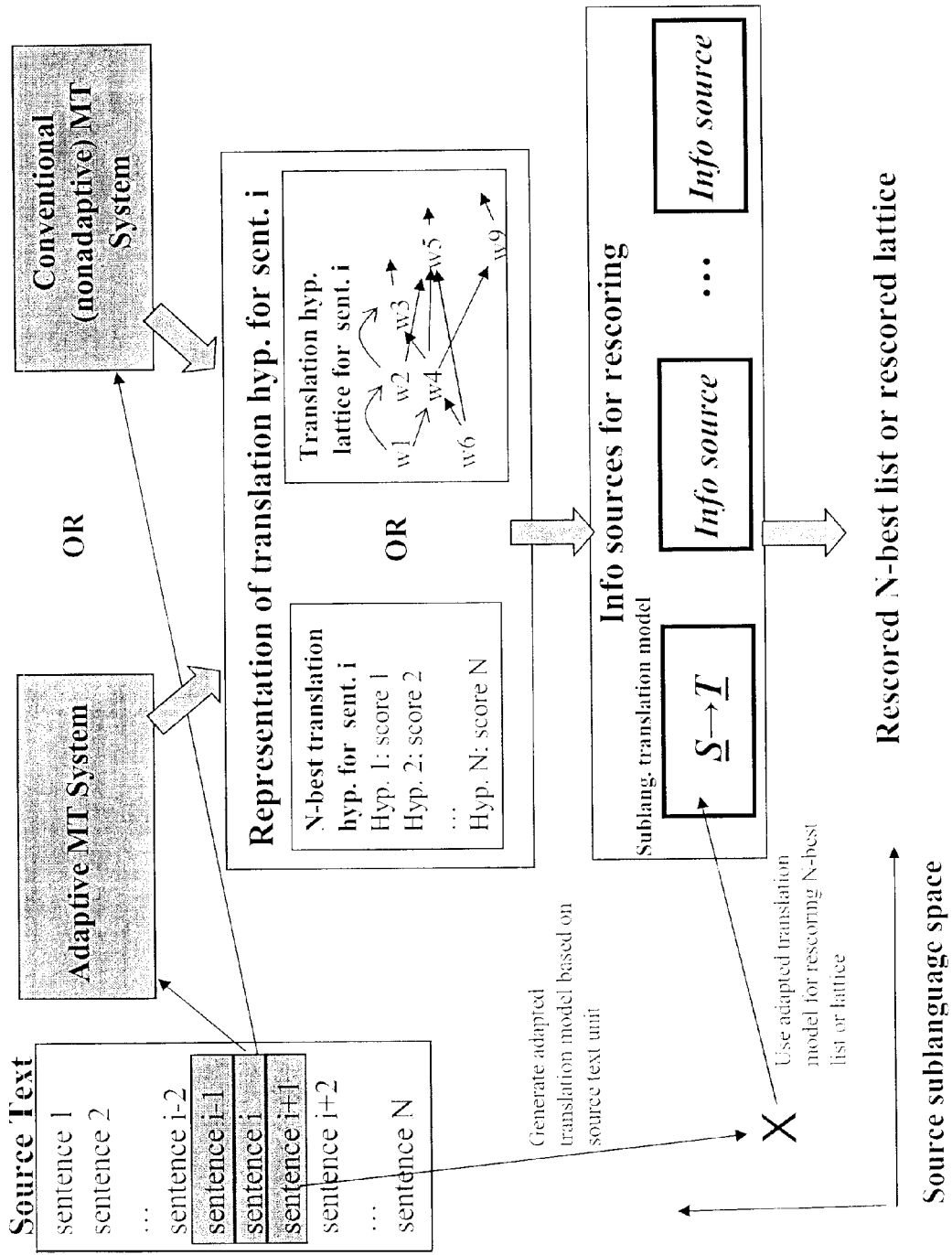

STATISTICAL MACHINE TRANSLATION ADAPTED TO CONTEXT

This application is a National Stage application of PCT Application PCT/CA2006/001004 filed 16 Jun. 2006 which claims benefit of U.S. Provisional Application 60/691,238 filed Jun. 17, 2005.

FIELD OF THE INVENTION

This application relates to a means and a method for adapted language translation. More specifically this application relates to a means and method for adapted language translation which considers contextual information.

BACKGROUND

Consider a text in a source language that needs to be translated into a target language. Current statistical MT systems operate on a sentence-by-sentence or line-by-line basis, with each source-language sentence or line being translated without consideration of the other sentences or lines in the surrounding text. Thus, if we extract a single sentence or line from the source text and put it into the MT system, that sentence will be translated in the same way as it would be if the whole source text were put into the system.

However, the meaning of a word sequence, and thus the way in which it may be correctly translated, typically depends on the context provided by surrounding text. Consider two hypothetical English paragraphs. The first paragraph begins: "After the auditor's report was released, doubt was cast on the institution's financial stability. Mr. Jones maintained that the bank was solid." The second paragraph begins: "After the flood, the townspeople asked the hydraulic engineer about future problems with the river bank. Mr. Jones maintained that the bank was solid." Since most languages do not share with English the convention that "bank" can mean both a financial institution and the slope leading to a body of water, nor the convention that "solid" can refer both to financial integrity and physical firmness, a good human translator would typically translate the sentence "Mr. Jones maintained that the bank was solid" into quite different target-language sentences, depending which paragraph it was in. By contrast, a conventional statistical MT system would translate this sentence in the same way in both cases. This is shown in the top part of FIG. 1, where each source sentence or translation unit is passed individually through the "global translation model" mapping source S onto target T. For the conventional system, information outside translation unit i does not affect the translation of translation unit i into the target language.

Each human language is made up of "sublanguages" or "discourse domains" within each of which words and phrases tend to have a single, unambiguous meaning. We can think of these sublanguages as regions located in a multidimensional sublanguage space. Of course, this space is continuous, and regions have fuzzy boundaries. That is, sublanguages overlap and blend into each other, forming a multidimensional continuum; they should not be thought of as discrete bubbles with clearly defined boundaries.

Most sublanguages will have equivalents in other human languages. Given a parallel text corpus consisting of documents belonging to a given sublanguage expressed in both a source and a target language, one can use well-understood techniques from the field of statistical machine translation to train a model for translating new documents written in the source language and belonging to that sublanguage to the target language. For instance, one might use a corpus of financial news stories in which each story is expressed in both English and French to train a system for translating financial news from English to French. Similarly, a corpus of parallel English and French articles about geography could be used to train a system for translating English texts about geography into French. The former system would tend to translate the English word "bank" into "banque" (the financial institution) while the latter would tend to translate it into "rive" (the geographical feature). Of course, the problem is that although today's techniques show how to create a specialized MT system for translating documents within a certain domain or sublanguage, many—perhaps most—applications of MT require a system that can produce satisfactory translations of documents that come from a varying, unpredictable mix of domains. Today's techniques are unable to create such a system.

A defender of current statistical machine translation systems might say that these systems can already be adapted to a new domain, by virtue of the fact that they tend to work well for the type of document they have been trained on. For instance, one may have trained such a system on a group of news stories about events of general interest. Then, a client requests a customized version of the system that will produce good translations for specialized articles about finance. One then "adapts" the system to this domain by retraining it on a bilingual, parallel corpus of specialized articles about finance. For instance, a system trained on financial articles will know only the financial meaning of the English word "bank", and thus accurately translate this word when new sentences from financial articles are given to it.

However, training a current statistical machine translation system is a slow off-line process, requiring hundreds or thousands times more computations than the process of translation itself. Currently, retraining a state-of-the-art system for a new domain may take several days. One might try to anticipate future needs by training a current system on a mix of types of documents, but that will not yield good results: it just increases the amount of ambiguity. For instance, a current system trained on a mixed set of documents might translate "bank" half the time with the financial sense and half the time with the geographical sense irrespective of the type of document it is given to translate, thus yielding poor overall performance. Thus, the defender of current statistical machine translation system would be wrong—these systems cannot be adapted quickly.

There is some background prior art concerned with statistical machine translation.

U.S. Pat. No. 5,805,832 by Brown et al. discusses a means of translating text from a source language into a target language. The system assigns probabilities and scores to various target language translations and makes available the translations with the highest score and probabilities.

U.S. Pat. No. 6,182,026 by Tillmann et al describes translating a source text into a target text through mapping of source words on target words using both translation model and language model.

And the published application US 2004/0030551 by Marcu et al. discloses the use of phrase based joint probability model where the model learns phrase to phrase alignments from word to word alignments generated by a machine translation system.

None of this prior art teaches the construction of a bilingual sublanguage space for adaptive statistical machine translation, nor the use of extra-sentential context in the source text for adaptive statistical machine translation.

A group of researchers at Carnegie Mellon University (CMU) has been exploring a form of adaptation of a statistical MT system in which information from the source sentence currently being translated is used to adapt the target language model, but neglects to take the context into consideration. This is done by feeding one or more initial translation hypotheses for the source sentence into an information retrieval system, which then locates documents in the target language that are used to retrain the language model. The source sentence is then retranslated, using the new language model. For this CMU approach, see "Language Model Adaptation for Statistical Machine Translation with Structured Query Models" by B. Zhao, M. Eck, and S. Vogel (in *COLING* 2004, Geneva, Switzerland).

It will be seen that neither the construction of bilingual sublanguage space nor the use of extra-sentential information is involved in this CMU approach. Furthermore, the CMU approach is extremely inefficient in computational terms. For each new source sentence, one or more initial translations must be carried out, a large set of documents queried, the language model rebuilt, and the translation carried out again with the new language model.

Another attempt to achieve adaptation of a statistical machine translation system was presented by A. Lagarda and A. Juan at the 7-8 Nov. 2002 meeting of the "Transtype 2" European project in Valencia, Spain. Using a "bag of words" representation for sentences, these researchers clustered a set of training sentences to create a sentence mixture model. This model was used to help decode new sentences. The experimental results showed no improvement over the original system. The system decoded sentences individually, without considering their context in the source text.

SUMMARY OF THE INVENTION

An object of the invention is to provide a means and a method for translating a document which is context dependent.

Another object of the invention is to provide a means and a method for adaptive machine translation.

An embodiment of this invention comprises a method for adaptively translating text from a source language into a target language, said method comprising the steps of identifying a translation unit to be translated from said source language to said target language, defining a source text unit, where said source text unit comprises said translation unit, mapping said source text unit into the bilingual sublanguage space, where said bilingual sublanguage space consists of a source language space and bilingual sublanguage space mappings, decoding said translation unit according to bilingual sublanguage space mappings.

An other embodiment of this invention comprises a method for translating text from a source language into a target language, said method comprising steps of identifying a translation unit to be translated from said source language to said target language, defining a source text unit, where said source text unit comprises said translation unit, decoding said translation unit to produce translation hypotheses, defining one or more than one component from a group comprising forward phrase translation model, backward phrase translation model, distortion model, and sentence length model, selecting a development corpus from documents that are similar to the source text unit, estimating weights to assign to said one or more than one components where said weights are estimated by the development corpus, assigning said weights, rescoring said translation hypotheses according to said weights.

Another embodiment of the invention comprises a computer readable memory for translating text from a source language into a target language comprising a translation unit, a source text unit, said source text unit comprising said translation unit, and a bilingual sublanguage space.

BRIEF DESCRIPTION OF THE DRAWINGS

FIG. 1A illustrates a conventional translation system

FIG. 1B illustrates an embodiment of the proposed system

FIG. 2 illustrates different means of defining the source text unit

FIG. 3 illustrates an alternative means of defining the source text unit

FIG. 4 illustrates an example of decoding in a continuous space

FIG. 5 illustrates an example of adaptive decoding based on weights estimated on a dynamically constructed development corpus FIG. 6 illustrates one embodiment of adaptive rescoring based on a bilingual sublanguage space

DETAILED DESCRIPTION OF THE INVENTION

In this document, the source word sequence S being translated (which is typically a sentence or line of text) will be referred to as the "translation unit". The invention can use information from a chunk of source text that includes translation unit S to produce a better translation of S into the target language. This chunk of text that includes S will be referred to as the "source text unit". Thus, the translation produced when translation unit S is put into the improved MT system by itself may differ from the translation produced for S when it is put into the improved system along with the rest of the source text unit containing S.

An embodiment of the machine translation (MT) system described here resembles a good human translator in that it can carry out context-dependent translation—that is, translation adapted to the text environment in which the translation unit finds itself. The lower part of FIG. 1 shows how the invention achieves this.

One aspect of the invention is a method for constructing a bilingual sublanguage space (as shown in FIG. 1) that addresses the problem of being able to produce the translation of a document that come from a varying, unpredictable mix of domains. Such a space comprises a source sublanguage space and a set of mappings (here symbolized by "S→T") from the source language onto text in the target language, with each mapping being associated with a location in the source sublanguage space. Each mapping provides means for generating from a source word sequence (the translation unit) one or more hypothesized target word sequences, such that a translation unit contained in a portion of text belonging to a particular sublanguage is likely to generate a word sequence belonging to the parallel sublanguage in the target language. Typically, each mapping incorporates a statistical model capable of estimating the conditional probability of a particular target word sequence, given a particular source word sequence, and each hypothesized target word sequence is accompanied by a score related to its conditional probability.

In one embodiment of the invention, the bilingual sublanguage space which consists in the source sublanguage space and the mappings into the target language, will be continuous: each point in the source sublanguage space will correspond to a mapping S→T. Mappings that are close together in the source sublanguage space will tend to have similar properties, while those that are far apart may differ. For instance, ambiguous source words will tend to be translated differently by mappings S→T that are distant from each other in the space (in the sense that the most probable translation output for such a word will depend on its location in the space). In general, though an infinite number of mappings are defined in the continuous space, a particular mapping will be instantiated only when needed. For instance, in one version of this embodiment, the source text unit is used in real time to find the weights for an interpolation function over a predefined, finite set of K mappings. These weights are passed as parameters to the interpolation function, which instantiates the particular mapping S→T used to translate the current translation unit. In this current embodiment, there is thus an infinite number of possible mappings S→T, all of which are linear combinations of the K predefined mappings; however, there are only K+1 "active" mappings at any time (the K predefined mappings and the mapping currently being used, which is a linear combination of the predefined ones).

In the figure, some regions in each sublanguage (for both target and source) have been labeled by topic, such as "finance", "sport", and so on, as an aid to understanding. However, there are no fixed boundaries demarcating regions in the source sublanguage space. For instance, an article describing the finances of major-league baseball might occupy a position between the region labeled "sport" and that labeled "finance"; An embodiment of our invention provides a method for deriving a specialized mapping S→T that would work well for that position in source sublanguage space. The arrows going from regions in the source sublanguage space to regions in the target sublanguage space indicate the types of translations that are assigned the highest probability. For instance, translation units (source word sequences) located in the source sublanguage region labeled "geography" are likely to be translated into word sequences characteristic of the target "geography" sublanguage.

There is a variant embodiment of the invention in which the space is discrete, rather than continuous, in the sense that only certain discrete points in the space are associated with mappings S→T. In this embodiment, source text unit might be mapped (prior to translation) onto the nearest point in the space where a mapping S→T is defined. For instance, an article describing the finances of major-league baseball might have to be mapped either onto the region labeled "sport", or that labeled "finance". For most purposes this discrete variant of the invention is less desirable than the continuous one.

Because of cultural and linguistic differences, the geometry of sublanguage space may differ somewhat from source language to target language. For instance, we might expect the Japanese sublanguage concerned with flower arrangement to have a much richer vocabulary than the corresponding English sublanguage. This aspect of bilingual sublanguage space is indicated in FIG. 1 by showing the orientation and size of the regions labeled "finance", "sport", and "geography" to be somewhat different in the source and target languages.

Finally, although some of the dimensions of bilingual sublanguage space may correlate with topic, others may reflect aspects of genre or style. For instance, most languages maintain a distinction between formality and informality that is independent of the topic. Thus, two documents in the same language about the same topic may occupy different positions in sublanguage space, if one is written formally and the other informally. In an embodiment of the invention, bilingual sublanguage space is defined automatically by statistical means, and its dimensions may thus not always be entirely interpretable in terms of topic, style, or genre (though they will often be correlated with them).

Having described bilingual sublanguage space, let us now consider what happens when a translation unit in the source text is translated. The lower part of FIG. 1 shows the translation of the ith translation unit according to the invention. (In the figure, the translation unit happens to be a sentence). First, the system locates a source text unit that includes translation unit i in source sublanguage space, at the position marked by an "X". Next, it constructs a specialized translation mapping S→T at this position. Finally, it uses this mapping to carry out the translation of translation unit i into the target language.

The distinction between the source text unit and the translation unit it contains is important: the former is used to find the appropriate mapping S→T, while the latter is the word sequence to which this mapping is applied. Of course, the source text unit could be defined to be the same as the translation unit. In this case, estimation of the position of translation unit i in source sublanguage space would be carried out only using the translation unit itself. In other words, though the option of using contextual information about text surrounding the translation unit is one of the advantages of the invention, it is quite possible to choose not to do this, and to use only the aspect of the invention that depends on the construction of a bilingual sublanguage space prior to translation. The advantages of this latter aspect, used by itself, are still considerable; they will cause clues given by words in the translation unit itself to trigger use of a specialized translation mapping associated with a location in the bilingual sublanguage space. Although such a system (employing the bilingual sublanguage space aspect of the invention but not the extrasentential context aspect) would not do better than a conventional system in translating a truly ambiguous sentence like "Mr. Jones maintained that the bank was solid", it will probably translate more accurately a sentence like "The hydraulic engineer, Mr. Jones, maintained that the bank was solid" (which contains a clue about the meaning of the ambiguous word that is located within the sentence).

However, as explained previously, the estimation is more likely to be carried out accurately if information from portions of neighbouring text—i.e., a source text unit that is larger than the translation unit—can be used. In FIG. 1, the location of sentence i in sublanguage space is determined using a source text unit consisting of a moving window of three sentences centered on sentence i. After this sentence has been translated, the new translation would be sentence i as illustrated in the target sublanguage space; for this translation unit, the source text unit would consist of sentences i, i+1, and i+2.

In practice, the correct granularity of text to use as the source text unit depends on the application. For instance, one could determine a location in sublanguage space for each source paragraph, or for the entire source text file. If the source text comes with pre-defined typographically indicated boundaries (e.g., a segmentation into "stories", "sections", or "articles"), it may be convenient to use the units defined by these boundaries as the source text units. Alternatively, one might employ an automatic text segment boundary detector, as is well-known in the field of natural language processing (see for instance U.S. Pat. No. 6,104,989 and U.S. Pat. No. 6,529,902, which show how to segment text into segments so that the topic does not change within a segment). If this approach is adopted, the source text unit will be defined as a window of varying size that includes the sentence or line currently being translated, whose boundaries are adjusted so that the text included in the window satisfies some criterion of homogeneity.

In general, using a coarse granularity for the source text units (e.g., by defining the source text unit to be the entire source text file, unweighted) requires less computation than using a fine granularity (since the adapted translation mapping is calculated once for the entire file in the former case).

If the file is heterogeneous in topic or content, there is a risk of losing accuracy when the granularity is coarse. On the other hand, if the granularity is very fine, accuracy may also go down, because useful contextual information was left out of the source text unit. For some applications—for instance, translating short, homogeneous news stories—it may be very convenient to define the source text unit as being the entire input source file, allowing use of the same adapted translation mapping for the whole file. For more heterogeneous inputs, it's preferable to allow the translation mapping applied to change as decoding proceeds (by defining the source text unit as a weighted window around the current sentence, line, or other translation unit, in which different parts of the source text unit are assigned different weights; or by defining it as an unweighted window around the current translation unit that's smaller than the whole input file).

In some cases, information about source sentences following the sentence currently being translated may be unavailable; in such cases, only preceding words can be included in the source text unit. An example would be use of an automatic speech recognition system coupled to a machine translation system for real-time transcription or interpretation followed by real-time translation into the target language. In this case, the speaker's future words are unavailable at the time translation takes place, so the source text unit can only include words spoken and transcribed in the past.

Once the source text unit has been defined, one may weight the information in the source text unit in order to assign less importance to words that are remote from the translation unit. For example, in the current embodiment, computation of the vector representing the source text unit could be modified by discounting the counts of words that are remote from the translation unit. In an embodiment of the invention, the appearance of a vocabulary word w anywhere within the source text unit causes the count for w to be incremented by 1. Instead, one could define the increment for an appearance of was being 1/d, where d is the number of words separating this appearance of w from the sentence or line currently being translated (i.e., the translation unit). Note that in this variant of the current embodiment, only the words contained in the current translation unit would receive the full weight of 1. Many other schemes of this kind, in which text in the source text unit is weighted in some way, are possible.

Some of these possible ways of defining the source text unit are shown in FIG. 2—as a symmetrical, asymmetrical, or weighted window around the translation unit. Of course, sentences don't need to form part of the definition—one could, for instance, define a symmetrical window of k words surrounding the translation unit. Note also that a weighted window can be asymmetrical. Finally, the source text unit may be defined to be the same as the translation unit.

FIG. 3 indicates another way in which the source text unit might be defined in the case where the translation unit is located in a web page on the Internet. Here, either because there is little text on the same page or because the page has very heterogeneous content, information on other linked pages might sometimes be highly relevant. In the diagram, we show a source text unit that includes source-language text from pages that have a "web distance" (number of links) of 1 from the parts of the original page near the translation unit— i.e., from pages that link directly to or from nearby text. It would be easy to generalize this kind of definition of the source text unit by allowing different values for the web distance (perhaps treating "from" and "to" links differently).

A variant of this idea applies in any context where the "natural" source text unit is very small, but where additional meta-information is available. Consider the case of an email consisting of only a few lines. On its own, the text of the email might be highly ambiguous, and therefore difficult to map with certainty into the source sublanguage space. However, the sender, recipient, and subject line fields provide additional information that can be used to retrieve similar emails with which to augment the source text unit. Many other document collections have structure that can be exploited in a similar way, possibly in conjunction with the automatic clustering techniques described below.

Let us now return to FIG. 1. To appreciate the advantages of the invention, consider first the example given earlier: the translation of an English sentence found in two different source texts into French. The first text begins: "After the auditor's report was released, doubt was cast on the institution's financial stability. Mr. Jones maintained that the bank was solid." The second text begins: "After the flood, the townspeople asked the hydraulic engineer about future problems with the river bank. Mr. Jones maintained that the bank was solid." Assume that the translation unit is a single sentence, and that the corresponding source text unit is the current translation unit itself and the preceding sentence. It seems likely that the source text unit in the first text will be mapped to a position within the "finance" region in the source sublanguage space in FIG. 1, while the source text unit in the second text will be mapped to a position within the "geography" region in the source sublanguage space. Thus, the translation unit "Mr. Jones maintained that the bank was solid" will be assigned two different mappings in the two cases The French translation for "bank" assigned highest probability will thus most likely be "banque" in the first case (a financial institution) and "rive" in the second (a geographical feature).

Because this example might give the wrong impression that the invention only models topic-related sublanguage phenomena, consider another example of two English texts to be translated into French. Both are extracted from dialogue. The first is: "Madam, it is a great pleasure to encounter you this evening. Do you come here often?" The second is: "It's great meeting you tonight, babe. Do you come here often?" In French (and almost all other European languages) the form of "you" used to address someone, along with the form of the verb of which "you" is the subject, depends on the degree of formality. In French, "vous" is the formal "you" and "tu" the informal "you". Thus, the correct translation of "Do you come here often?" is "Est-ce que vous venez ici souvent?" in the first case, and "Est-ce que tu viens ici souvent?" in the second, even though the topic of the two texts is precisely the same. In the case where the procedure for obtaining the bilingual sublanguage space results in a dimension or combination of dimensions modeling the formality-informality gradient, the invention will ensure that the two texts map onto different regions of the space, and thus be capable of generating an appropriate translation for "Do you come here often?" in each case. Of course, this advantage of the invention applies to many other language pairs besides English-French.

One aspect of the invention is the module that finds the location of a source text unit in the source sublanguage space. To implement this module, one requires a similarity measure between texts in a given language, with source text units that are similar being assigned to nearby points in the space, and dissimilar source text units being assigned to points that are far apart from each other in the space. In the technical literature in the area of information retrieval, one can find many different similarity measures with the desired properties. These measures underlie, for instance, the ability of search engines to find documents or web pages that are "close" to a set of words typed into the search engine by the user, or to find web pages that are "close" to another web page. Below, the precise similarity measure used in the current implementation is described. However, note that the module for finding the location of a source text unit in the source sublanguage space can be constructed according to a wide variety of well-understood techniques used in creating today's information retrieval systems.

An embodiment of the invention has been carried out in the framework of phrase-based statistical machine translation. Phrase-based machine translation based on joint probabilities is described in "A Phrase-Based, Joint Probability Model for Statistical Machine Translation" by D. Marcu and W. Wong in *Empirical Methods in Natural Language Processing,* 2002; a slightly different form of phrase-based machine translation based on conditional probabilities is described in "Statistical Phrase-Based Translation" by P. Koehn, F.-J. Och, and D. Marcu in *Proceedings of the North American Chapter of the Association for Computational Linguistics,* 2003, pp. 127-133. In both cases, decoding (translation) of a source sentence S is carried out by finding a word sequence T in the target language that maximizes the function P(S|T)*P(T). The probability P(S|T) is estimated by a part of the system called the "translation model", encoded in a data structure which is called the "phrase table". The probability P(T) is estimated by a part of the system called the "language model". The translation model is estimated from training data consisting of bilingual aligned text in the source and target language; the language model is estimated from text in the language model only. A phrase-based machine translation system often comprises three components: the translation model (for estimating P(S|T)), the language model (for estimating P(T)), and the decoder (for finding a sequence of words T that maximizes the estimated P(S|T)*P(T) for a given source line or sentence S). Other components may also communicate with the decoder and influence the translations it produces: for instance, a "forward" phrase translation model P(T|S), a distortion model for predicting how the target-language phrases are likely to be ordered with respect to the original order of the corresponding source-language phrases, a sentence length model that predicts the most likely number of words in a target-language translation as a function of the number of words in the source-language translation unit, and so on.

Although the current embodiment of the invention is phrase-based, the invention is also applicable in the context of other approaches to statistical machine translation. For instance, it is applicable to the approaches based on the models collectively known in the machine translation research community as the "IBM models", which are defined in "The Mathematics of Statistical Machine Translation: Parameter Estimation" by P. Brown et al., *Computational Linguistics,* June 1993, V. 19, no. 2, pp. 263-312. Henceforth, the expression "IBM models" in this document will refer to the mathematical models defined in this article by P. Brown et al.

Also, note that considerable research is currently being undertaken into the use of grammatical analysis and syntax for improving the performance of statistical machine translation systems. It would be straightforward to combine this invention with the use of grammar and syntax. For instance, the bilingual sublanguage space could be trained on document pairs in which both the source-language and target-language portions of each document pair had been syntactically parsed by a global parser. In this implementation, the source text unit would be parsed prior to being assigned a location in the bilingual sublanguage space. Alternatively, one could incorporate syntactic rules for translating from the source to the target language with other aspects of the translation mapping associated with each point in the bilingual sublanguage space. In this implementation, the syntactic rules applied would depend on location in the space (this has significant advantages, since parsing is often complicated by word ambiguities, some of which disappear when the sublanguage is specified). In this version, source text units would not be parsed; rather, the translation unit would be parsed once the source text unit had been assigned to a particular location in the bilingual sublanguage space.

Details will now be given about the following:
1. construction of the bilingual sublanguage space.
2. use of the bilingual sublanguage space to make decoding (translation) of the source language into the target language adaptive, and thus more accurate.
3. adaptive decoding based on weights estimated from a dynamically constructed corpus
4. use of the bilingual sublanguage space or adaptively estimated weights as an information source for rescoring or reordering of translation hypotheses.
5. for certain applications, the dynamic adaptation of the bilingual sublanguage space.

Construction of the Bilingual Sublanguage Space

The bilingual sublanguage space can be "trained" on a collection of bilingual document pairs in electronic format. Each pair is either a source-language original in parallel with a target-language translation, or a target-language original in parallel with a source-language translation. Preferably, the documents should represent a wide variety of topics, genres, styles, and so on, to ensure that the bilingual sublanguage space covers many different sublanguages. By "document" is meant a segment of text of any kind; there is no implication that a document represents all of the original text, article, file, book, or publication. The remarks made above concerning the many possible granularities for source text units also apply to these training document pairs. For instance, some of the document pairs might consist of twin paragraphs from publications (the paragraph and its translation); others might consist of twinned text segments extracted by an automatic text segmentation algorithm (a segment and its translation). However, it is absolutely necessary that each half of the document pair represent a complete translation of the other half.

In a phrase-based embodiment of the invention, the initial step is phrase alignment between the source-language and target-language portions of each bilingual document pair, as described in the references above. Here, a phrase just means a contiguous sequence of words. In this implementation, alignment is two-pass. In the first pass, word alignment is carried out by means of the IBM models as described above. In the second pass, phrase alignment is carried out on the basis of the word alignments. This kind of two-pass phrase alignment is well-known in the statistical machine translation community; it is described, for instance, in "Improved alignment models for statistical phrase translation" by F. Och et al. in *Proceedings of the Joint Conference on Empirical Methods in Natural Language Processing and Very Large Corpora,* 1999 (pp. 2-28).

Other methods for performing word alignment in the first pass could be substituted for the standard IBM-based technique. Such techniques include iterative competitive linking and orthogonal matrix factorization. Additionally, methods for performing phrase alignment that do not rely on explicit word alignment could be used.

Once phrase alignment has taken place, a table comprising the joint counts C(S,T) for the document pair is constructed; each entry in the table gives the number of times source-language phrase S was aligned with target-language phrase T in a given document pair.

All that is required to complete the construction of a bilingual sublanguage space is definition of a similarity measure between a source text unit and a document pair. Given this similarity measure, one can map a source text unit onto a weighted combination of the D joint count tables C(S,T) corresponding to the D document pairs, where documents that are similar to the source text unit are assigned large weights, and documents that are dissimilar from the source text unit are assigned small weights. In this manner, one obtains an interpolated joint count table C(S,T) adapted to the source text unit. From this kind of joint count table, a phrase table of conditional probabilities P(S,T) for use in decoding can easily be constructed, for instance using relative-frequency estimates: P(S,T)=C(S,T)/C(T) The phrase table for the reversed condition, P(T,S), which is needed to apply certain heuristics for decoding, is constructed in similar manner. It would also be possible to calculate a conditional probability phrase table P(S,T) for each of the D documents and interpolate these instead of the joint count tables. In the current embodiment, the language model P(T), which is also required for decoding, is trained separately; a single, global language model is applied irrespective of the nature of the source text unit. Thus, in the current embodiment, the translation mapping applied to the translation unit S is a search over possible T such that P(S,T)*P(T) is as large as possible, where the model for P(S,T) is adapted according to the characteristics of the source text unit containing S, but the language model P(T) is not adapted. Below, we will show how P(T) could also be adapted. Thus, for the phrase-based implementation of the invention, one could choose to adapt only P(S,T), only P(T), or both. Adapting both language and translation models has the advantage that elements from the current sublanguage are unlikely to be suppressed just because they may be rare in general usage.

The target-language portion of the document pair does not enter the similarity calculation; only the similarity between the source text unit and the source-language portion of the document pair needs to be calculated. Two reference books in this area are "Automatic Text Processing" by G. Salton (Addison-Wesley Publishing Company, 1989) and "Modern Information Retrieval" by R. Baeza-Yates and B. Ribeiro-Neto (Addison-Wesley Publishing Company, 1999). Any of the text similarity measures described in these references could be employed in our invention in the place of the measure included in the current embodiment. Note that some measures assign a high number to two dissimilar texts, and a low number to texts that are similar; such measures are typically called "distance measures" rather than "similarity measures". It is mathematically trivial to transform a distance measure into a similarity measure. Thus, the invention could also use any of the distance measures described in the above references.

In an embodiment of the invention, both the source text unit and the source-language portion of the document are represented by a vector of real numbers of dimension V obtained from vectors of word counts within each text. This is done by application of the so-called "term frequency inverse document frequency" transformation to the counts (see Salton pg. 304) in order to increase the weight accorded to the most informative words. We will refer to the resulting V-dimensional vector as an S-vector, because it contains only information related to the source language. Here, if we decide to keep track of word counts for all words in the system's vocabulary, the dimension V is the number of source-language words in the system's vocabulary. However, it is common practice to drop some uninformative words called "stop words" from the list; these are often common function words like "and", "but", "or", and so on. Thus, V may be less than the number of words in the system's vocabulary. In an implementation of the invention, no words are dropped, and V is thus equal to the size of the source-language vocabulary.

In the current embodiment of the invention, the distance between the two S-vectors thus obtained from the source text unit and the source-language portion of the document pair respectively is defined to be the cosine measure (see Salton, Table 10.1, pg. 318). For two S-vectors v1 and v2, this is defined as the normalized dot product of the vectors:

$$\mathrm{cosine}(v1,v2) = v1 \cdot v2 / \mathrm{squareroot}((v1 \cdot v1)*(v2 \cdot v2))$$

The cosine measure is a similarity measure as defined above: it yields a number close to 1 when v1 and v2 are obtained from highly similar texts, and yields a value close to 0 when v1 and v2 are obtained from highly dissimilar texts.

Of course, there are many other possible ways of defining the S-vectors characterizing each document pair (or rather, the source-language portion of the pair) and the source text unit, and many other possible ways of defining the distance between S-vectors (see Salton 1989 or Baeza-Yates 1999, cited above, for some of these possibilities).

Although the above procedure is sufficient to construct a bilingual sublanguage space according to the requirements of the overall invention, in the current embodiment we perform an additional step. This optional step is a clustering of bilingual document pairs into K clusters, where K is less than D; we currently perform it using the well-known K-means clustering algorithm. The reason for performing this step is to reduce storage requirements, to reduce computational complexity during decoding, and to potentially enhance performance in cases where the original document pairs are small. Note that there are many different ways of clustering text data besides K-means clustering, for instance K-medoids, hierarchical clustering, mixture modeling, and self-organizing maps.

To carry out the K-means clustering, we again require a vector to be associated with each document pair or cluster. It would be possible to use the S-vectors described above, derived from source-language word counts in each document pair, for this purpose. The disadvantage of this is that we wish to cluster together document pairs that have similar translation usages, and the S-vectors derived from source-language word counts reflect only source-language aspects of each document pair. Thus, we currently instead derive a new kind of vector for each document pair that is based on joint phrase counts. Let J be the number of different aligned source-target pairs from all document pairs. For each of the document pairs, create a J-dimensional vector; this is then filled in with real numbers derived by means of the "term frequency inverse document frequency" transformation from the joint phrase counts for that document pair. For convenience, we will refer to this J-dimensional vector obtained from joint phrase counts for a document pair as the document pair's "J-vector". Thus, let entry i in each J-vector represent the aligned phrase pair (s,t); then, for a particular document pair, the value for entry i in that pair's J-vector is obtained from the number of times phrase pair (s,t) occurred in the alignment for that document pair. The similarity measure currently used for these vectors is, again, the cosine measure (although it is now applied to two J-vectors of dimension J, rather than two S-vectors of dimension V). Given two document pairs A and B, this measure applied to the J-vectors obtained from A and B will yield a value close to 1 if the same phrases are translated in similar ways in A and B, but will yield a value close to 0 if A and B have dissimilar translation usages. An important difference between the S-vectors defined earlier and these J-vectors is that the former contain only information related to source-language text characteristics, while the latter are directly related to bilingual translation characteristics. A disadvantage of the current procedure is that the J-vectors are very sparse, i.e., contain mostly zeros, since for a particular document pair, most of the J possible aligned phrase pairs do not appear.

For the K-means clustering of document pairs, a value of K less than D must be chosen. Each of the K clusters will be characterized by a centroid J-vector; this can be called a J-centroid. First, the K J-centroids are initialized to be K different J-vectors chosen at random from the D J-vectors associated with the D document pairs. Next, each of the D documents is assigned to the cluster whose J-centroid is closest to the document's J-vector. Now, each of the K J-centroids is recomputed to take account of all the aligned phrases in the documents assigned to its cluster. Then, documents are reassigned to the cluster with the closest J-centroid. The process is iterated until cluster membership stops changing.

This procedure can be repeated several times, beginning with a new random choice of K different J-vectors to initialize the J-centroids. We choose the cluster definition resulting in the smallest average distance (largest average similarity) between document pairs and their cluster J-centroids. Finally, a joint phrase count table is computed for each cluster, using counts of aligned phrases from all documents assigned to that cluster. As noted above, given a joint phrase count table $C(S,T)$, one may easily compute a phrase table of conditional probabilities $P(S|T)$. We also need to associate each cluster with an S-centroid: a V-dimensional vector derived from source-language word frequencies within documents assigned to that cluster. Note that in the current embodiment, the J-vectors and J-centroids are used only during clustering, which is part of the process of training the bilingual sublanguage space.

During translation (decoding) these J-vectors are irrelevant, but the S-centroids are important; source text units are located in the space by measuring their similarity to the S-centroids.

So far, we have described an embodiment in which the target language model $P(T)$ is a global one that is employed in all cases, independently of the characteristics of the source text unit. In an alternative embodiment, not only the translation model component $P(S|T)$ but also the language model component $P(T)$ of the system is adapted to a source text unit including the translation unit currently being translated. This could be done, for instance, by associating a language model in the target language with each of the clusters constructed as described above. Note that since each of the clusters consists of a set of document pairs where half of each pair is a document written in the target language, it would be straightforward to train a language model for each cluster on all the target-language documents in that cluster. Alternatively, the language model could be adapted in a way that directly parallels TM adaptation: weight counts derived from each cluster, then derive an adapted model from the weighted counts.

Typically, target language models for machine translation can be trained on more data than the translation model, since there are often more unilingual target-language documents available than there are bilingual source-target translated document pairs available. Thus, once the initial language model for each cluster has been obtained as described in the preceding paragraph, it can be improved by assigning additional target-language documents to the cluster, and retraining the language model on the larger set of documents now associated with the cluster. Assignment of new target-language documents to a cluster could be done, for instance, by employing techniques from the information retrieval literature, whereby text from target-language documents originally in the cluster would be used in queries to find similar target-language documents from a large collection of such documents. Alternatively, a language model for a particular language yields a probability for any document in that language. Thus, given an initial set of language models (one per cluster) and a large collection of target-language documents, each target-language document could be assigned to the cluster whose language model assigns it the highest probability.

Use of the Bilingual Sublanguage Space for Adaptive Decoding

The preceding section described how the bilingual sublanguage space is constructed. In the current embodiment, the bilingual sublanguage space will consist either of clusters consisting of the original D document pairs or of K clusters derived from these document pairs via K-means clustering. Associated with each cluster is an S-centroid vector of dimension V characterizing its position in the source-language subspace.

To carry out decoding of a new translation unit (the word sequence to be translated), we define a source text unit including the translation unit, as already described. A V-dimensional S-vector is obtained from the source text unit by calculating word counts and transforming them (currently by means of the "term frequency inverse document frequency" transformation as previously described). The distances between this S-vector for the source text unit and the bilingual sublanguage centroids are then calculated; for instance, by means of the cosine measure already described.

In the discrete version of the invention, a source text unit would be assigned to the cluster whose S-centroid is closest. Decoding for the new source sentence would then proceed according to the translation mapping associated with that cluster.

In another continuous version of the invention, a specialized translation model can be constructed for the current translation unit by combining statistics from the clusters in a way that assigns more importance to clusters that are near the source text unit than to clusters that are far from it. In the current embodiment, we obtain an "interpolated joint phrase count table" by multiplying each joint phrase count table entry in a cluster by the cosine similarity between the S-centroid for the cluster and the S-vector for the source text unit; entry i for the interpolated joint phrase count table is obtained by adding together the resulting i entries for the clusters.

In other words, let $IJ_i(S,T)$ represent the ith entry in the interpolated joint phrase count table for source phrases S and target phrases T. Let u represent the S-vector for the current source text unit, let c1 represent the S-centroid for cluster 1, let c2 represent the S-centroid for cluster 2, and so on. Finally, let $C_j(S,T)$ represent the joint phrase count table for cluster j, and let $C_{ji}(S,T)$ represent the ith entry in this table. Then, for K clusters, we have:

$$IJ_i(S,T) = \cosine(u,c1)*C_{1i}(S,T) + \cosine(u,c2)*C_{2i}(S,T) + \ldots + \cosine(u,cK)*C_{Ki}(S,T)$$

If a particular cluster $C_j$ was trained on document pairs whose source-language portions are similar to the current source text unit, cosine(u,cj) will be close to 1; if it was trained on document pairs whose source-language portions are unlike the current source text unit, cosine(u,cj) will be close to 0. Thus, the joint phrase count table associated with cluster $C_j$ will have a large impact on the interpolated joint phrase count table $IJ(S,T)$ in the former case, but not the latter.

This description assumes that all phrase pairs within a joint phrase count table will be treated the same, but this need not be the case. Different phrase pairs will tend to exhibit different degrees of variation across sublanguages, and those that are more variable should have their counts changed more in the final adapted table than those that are relatively static. This could be accomplished by classifying phrase pairs according to how much their counts varied among joint count phrase tables for all clusters. Pairs with low variation would be multiplied by a "flattened" version of the cosine weight (one that is closer to a constant across all clusters, possibly implemented using the sigmoid function described below), while those with high variation would be multiplied by the unmodified cosine weight. This would have the effect of reducing the effect of accidental statistical variation on parts of the core language that should remain stable within the adapted model.

FIG. 4 shows how decoding is carried out in a variant of the current embodiment, where the distance measure d( ) is a true distance and not a similarity (i.e., a large value of d(t1,t2) indicates that its arguments t1 and t2 are dissimilar). In the figure, there are four document clusters. Each cluster has an S-centroid (shown as a black circle in the middle of each cluster) and an associated table of aligned joint phrase counts $C_i(S,T)$. Two source text units, A and B, are shown. For each of the source text units, a V-dimensional S-vector derived from counts of the words in the unit is obtained, as described above; these are the steps "Find S-vector representing A" and "find S-vector representing B" in the figure. The distances between the two S-vectors representing the source text units, on the one hand, and the cluster S-centroids, on the other hand, are then calculated. For instance, "$d_{A3}$" in the figure represents the value of the distance between the S-vector representing source text unit A and the S-centroid associated with cluster 3. These distances are used to weight the contribution of the joint phrase count tables from the clusters to the adapted joint phrase count tables, as shown in the figure. For instance, it is clear that the information from cluster 1 will have a greater impact on the adapted count table for source text unit A than on the adapted count table for source text unit B, since $d_{A1}$ is smaller than $d_{B1}$.

Given the adapted joint phrase count table for a source text unit, it is straightforward to construct the corresponding model. Recall that in the current embodiment, we use the function P(S|T)*P(T) to carry out decoding. P(T) is estimated by a language model that is not itself adapted (in the current embodiment of the invention), so we only require a model for the conditional probability: P(S|T). For each aligned phrase pair (s,t), the conditional probability P((S|T)) can be estimated from the counts C(s,t) in the adapted joint phrase count table by means of the equation $P(s|t)=C(s,t)/\Sigma_{s'}C(s',t)$.

In a straightforward generalization of this approach, the distances will not be used directly when combining the information associated with each of the clusters. Instead, a sigmoid function based on distance will be used. The advantage of a sigmoid function is that it can permit the weight assigned to information from a particular document or document cluster to depend on the distance from the source text unit in a number of ways, depending on the value of the function's parameters. For instance, it makes it possible to penalize information from documents that are very dissimilar from the source distance text unit more or less heavily than the cosine measure does, depending on these parameter values. On the other hand, if a sigmoid function is used, considerable experimentation is required to find the optimal settings of the function's parameters.

In an alternative embodiment referred to above, not only the translation model component P(S|T) but also the language model component P(T) of the system is adapted to a source text unit that includes the translation unit currently being translated. Above, we described how a system of this type could be trained in a manner that associated each training document pair or document pair cluster with a language model for the target language. In this embodiment of the invention, the adapted language model for the target language could be obtained by interpolating the predictions of the cluster language models, or by interpolating the N-gram counts associated with the cluster language models. As with the translation model component, language model adaptation would be carried out by assigning greater weights to language models or language model counts associated with clusters that are close to the current source text unit, according to a similarity measure applied to the S-vector for the current source text unit and the S-centroids for the clusters. The similarity measure would not have to be the same as the one used for translation model adaptation, though it could be; a sigmoid function (not necessarily the same one) could also be used for language model adaptation.

A key aspect of the invention is the speed with which adaptation takes place, due to the simplicity of the computation involved during decoding. One can imagine a highly inefficient implementation of the invention whereby the distance between the source text unit and each training document pair or cluster is found, the phrase table or joint phrase count table for each pair or cluster is then calculated, these tables are combined according to the distance-based interpolation coefficients, and only then does decoding take place according to the combined table. By contrast, in one implementation of the invention, precompilation of the summary statistics associated with each training document pair or cluster (e.g., the phrase table, joint phrase count table, or language model for the pair or cluster) allows adaptation to take place very quickly.

Adaptive Decoding Based on Weights Estimated from a Dynamically Constructed Corpus This section describes a form of adaptive decoding somewhat different from that described in the previous section. Recall that a state-of-the-art phrase-based machine translation system often comprises three components: the translation model (for estimating P(S|T)), the language model (for estimating P(T)), and the decoder (for finding a sequence of words T that maximizes the estimated P(S|T)*P(T) for a given source line or sentence S). In addition, other components may also communicate with the decoder and influence the translations it produces: for instance, a "forward" phrase translation model P(T|S), a distortion model, a sentence length model, and so on.

We did not previously discuss how information from these components is combined. In today's systems, each of these components is defined so that it can yield a numerical score for a partial or complete translation hypothesis for a given source-language input; each of the components is trained separately. For the decoder to carry out translation, it must know how to combine the scores from these components. This requires assigning a weight to each component score. For instance, if the scores are given as probabilities, we can raise each to a power α and then take the product of the resulting component scores as the overall core. E.g., if the decoder only employs component scores from the translation models P(S|T) and P(T|S), and from the language model P(T), we could define the overall score for target hypothesis T as $\text{score}(T|S)=P(S|T)^{\alpha 1}*P(T|S)^{\alpha 2}*P(T)^{\alpha 3}$ The decoder will seek to find the target hypothesis T that maximizes this score. Since this is equivalent to maximizing the logarithm of the score, $$\log(\text{score}(T|S)) = \alpha 1 * \log P(S|T) + \alpha 2 * \log P(T|S) + \alpha 3 * \log P(T),$$

this kind of model is called a "log-linear model" (where the overall score is a linear combination of the logarithms of the component scores). In general, a log-linear model will have the form $$\log(\text{score}(T|S)) = \alpha 1 * \log f_1(S,T) + \alpha 2 * \log f_2(S,T) + \ldots + \alpha n * \log f_n(S,T),$$

where $f_i(\ )$ represents the score returned by the ith component for hypothesis T.

Clearly, prior to using the system for translation, it is necessary to find appropriate weights $\alpha 1, \alpha 2, \ldots, \alpha n$ for the components. Typically, this is done (after training each of the components) by means of an estimation procedure performed on a small "development" corpus (often called the "dev" corpus) which is made up of bilingual sentence pairs and chosen at random. In this estimation procedure, the decoder is given initial settings for the weights $\alpha 1, \alpha 2, \ldots, \alpha n$ and used to decode the source sentences in the dev corpus. The weights are changed, according to a mathematical formula, until the translations produced sufficiently resemble the target-language translations in the dev corpus. In other words, the estimation procedure adjusts the weights $\alpha 1, \alpha 2, \ldots, \alpha n$ until the decoder with these weights on its components is capable of producing translations similar to those seen in the dev corpus.

The dev corpus is chosen more or less at random. In one embodiment of the current invention, however, the dev corpus is constructed from bilingual document pairs whose source-language portion is similar to the source text unit. In other words, the dev corpus is made up of documents which are close to the source text unit in the bilingual sublanguage space, according to an appropriate similarity measure between a source text unit and a document pair (as described earlier). Thus, in this embodiment of the invention, adaptation to the source text unit occurs by changing the weights on the scores returned by the components that communicate with the decoder. Note that there may be several different components, such that some of them represent a different estimates for phrase translation model P(S|T), some of them represent different estimates for P(T|S), and some of them represent different estimates for language model P(T). For instance, perhaps these components differ in being trained on different corpora. Thus, this embodiment of the invention provides a slightly different method for combining information from different phrase translation models and different language models than the methods described in the previous section.

FIG. 5 shows schematically how this aspect of the invention works. A "dev corpus selection module" takes as input the source text unit and a collection of bilingual aligned document pairs, and selects a subset of the document pairs whose source-language portions are sufficiently close to the source text unit (according to a distance metric defined in source sublanguage space). In the figure, the selected document pairs are #1, #2, and #4. These are aggregated to form a development ("dev") corpus for weight estimation. The chosen weight estimation procedure is then invoked on this dynamically constructed dev corpus to find good values for the N weights on the N scores output by the N components that communicate with the decoder.

The reason that this kind of adaptive decoding can yield good results is that a particular component may supply information that's very valuable for translating certain types of source sentences, while information from this same component may be only very mildly useful or even useless for other types of source sentences. If the dev corpus contains source sentences resembling the sentence to be translated, along with their translations, the weight estimation algorithm can learn to put more emphasis on information coming from components that are especially useful for translating this type of source sentence, by increasing the weights on the scores produced by these components and diminishing the weights on the scores produced by the other components. Note that the granularity of the bilingual documents that are selected for inclusion in the dev corpus may vary. For instance, each selected document may be a single sentence pair (a source-language sentence and its target-language translation) extracted from a different bilingual text.

In an embodiment of the invention, the scoring function for combining component scores in the decoder is log-linear, the weight estimation procedure used is that described above, and the measure of quality of translation used to find the weights on the component functions from the dev corpus is the BLEU metric. However, adaptive decoding based on adjusting component weights on a dev corpus chosen for its similarity to the source text unit could be applied to scoring functions of a different form, using other weight estimation procedures, and using other measures of translation quality. For instance, it would be possible to apply maximum-likelihood estimation of component weights, by attempting to maximize the probability that the source-language sentences in a dev corpus chosen for its similarity to the source text unit generated the target-language translations for them found in that dev corpus.

Use of the Bilingual Sublanguage Space or Adaptively Estimated Weights for Rescoring Many of today's statistical machine translation systems perform translation in two steps. The output of the first step is a representation of the most probable translation hypotheses for the translation unit. This representation may, for instance, be a set of N hypotheses, each accompanied by a probability score (an "N-best list"), or a word lattice with probabilities associated with transitions in the lattice. The first step is typically performed by the decoder as described above, in a manner whereby the decoder calculates an overall score for each hypothesis that is a weighted combination of component scores. In the second step, a set of information sources is used to assign new probability scores to the translation hypotheses encoded in the representation output from the first step; this is called "rescoring". The only requirement for an information source in this framework is that it be capable of generating a numerical score for each translation hypothesis. Typically, the set of information sources for rescoring is different (usually larger) than the set of components that communicate with the decoder in the first step.

Typically, a weight estimation procedure is invoked prior to use of the complete two-step system to assign weights to the information sources employed in the second step, with larger weights being assigned to more reliable information sources. This weight estimation procedure is often the same as that employed to estimate the component weights for the first step (decoding); however, the set of information sources for which weights are required is typically different.

FIG. 6 shows another embodiment of the invention, in which the bilingual sublanguage space is optionally used in a rescoring step to improve translation of the translation unit (possibly along with other information sources for rescoring). As described previously, the source text unit containing the translation unit is used to obtain an adapted translation mapping. However, the adapted translation mapping is used for rescoring. This can be done because the adapted translation mapping is capable of generating a statistical score for a particular translation hypothesis, based on the target-language word sequence of this hypothesis and the source-language word sequence of the translation unit. As the figure shows, the adapted translation mapping can be used for rescoring no matter how the representation of the translation hypotheses was generated. For instance, one might generate the translation hypothesis representation using a conventional (non-adaptive) statistical machine translation system, but then rescore adaptively with the adapted translation mapping. Alternatively, one might generate the translation hypothesis representation using adaptive translation based on bilingual sublanguage space, and then also rescore adaptively with the adapted translation mapping. In this latter case, one might even use different adapted translation mappings for the generation and rescoring steps—for instance, by using differently defined source text units surrounding the translation unit for the two steps.

Additionally, just as a dynamically constructed development corpus can be used in the procedure for estimating weights on the components that communicate with the decoder as described in the previous section, so such a dynamically constructed corpus can be used to estimate weights on the information sources for rescoring. The method is exactly as shown in FIG. 5, except that the dev corpus selected for similarity to the source text unit is employed to estimate weights on information sources for rescoring.

Alternative Embodiments

Dynamic Adaptation of the Bilingual Sublanguage Space

The above description implicitly assumes that the bilingual sublanguage space is constructed in advance, from a static collection of documents, before the source text is available, and is not subsequently changed. In an alternative embodiment, the bilingual sublanguage space is itself adapted after the source text becomes available, shortly before translation takes place. This will not be a complete retraining on a new collection of documents, starting from scratch, as is already known to be a means of building a machine translation system for a new domain. As we have seen, such a retraining is a computationally expensive, time-consuming, offline operation. Instead, this aspect of the invention is a way of quickly "tweaking" or dynamically adapting a previously trained bilingual sublanguage space.

As an example, consider the application of the invention to the translation of a web page in a source language. Suppose the user has just clicked on the link to the web page he or she wishes to read in the target language. The web page itself presumably does not contain a translation into the target language—if it did, use of the invention would be unnecessary. However, the web page may contain links to other web pages, which may themselves contain links, and so on.

By following the sequence of links in this manner, starting with the target-language web page to be translated, one may arrive at web pages that have the desirable property of containing parallel texts in the source and target language, which may be translations of each other. There are well-understood heuristics in the machine translation literature for determining whether two texts are likely to be translations of each other (appropriate relative lengths, co-occurrence of names, co-occurrence of words known to be translations of each other, and so on). Following the links and using these heuristics, it is thus possible to rapidly accumulate a collection of bilingual target-source document pairs that can be added to those used to construct the original bilingual sublanguage space. These newly found bilingual resources space can be used to reconstruct the bilingual sublanguage space in dynamic, incremental fashion. The reason this may be desirable is that the newly located bilingual documents are likely to have content closely related to that in the web page to be translated, since they were directly or indirectly linked to that page. Certain source-language words and phrases contained in the web page to be translated may not occur in the documents originally used to train the space; incorporation of the linked bilingual documents may enable the system to deal with these more effectively.

Another example of where this aspect of the invention might usefully be applied is for a busy translation agency with a central database of completed and human-approved translations (in the form of bilingual document pairs). Suppose that the agency is using a machine translation system incorporating the current invention, that the system is using a bilingual sublanguage space trained on a huge number of documents, and that performance of the system is already quite satisfactory. In this situation, the agency will not want to retrain the whole system every time a new document pair becomes available. On the other hand, since there will be time-dependent variations in the nature of documents submitted for translation (for instance, the agency may develop a new set of clients in a certain industry, all of them using a sublanguage only sparsely represented in the original training data for the bilingual sublanguage space) it would be convenient for the bilingual sublanguage space to benefit from information in newly-translated document pairs. Clearly, for exactly the same reasons, an individual translator who carries out machine-aided translation with the aid of the invention may find it useful from time to time to adapt the bilingual sublanguage space he or she has been using to reflect translations he or she has completed or approved.

A variant of this scenario would be the case of an Internet-based email translation service based on the invention, where users submit their source-language emails to the service, edit the translation provided, and then send it off when they're satisfied. In this case, the sending of an email would be the sign that the translation has been "approved" by the user, triggering use of the document pair (the source-language and target-language versions of the email) to adapt the original bilingual sublanguage space.

In the current embodiment, there are at least two strategies for performing dynamic adaptation of the bilingual sublanguage space at low computational cost; preferably, both should be used. For both, the new bilingual document pair must first be phrase-aligned, and its joint phrase counts and J-vector calculated. Then, the distance between the J-vector of the new document pair and the J-centroid for each cluster is calculated. The first strategy for adapting the space to the new document pair is to assign the new document pair to the nearest existing cluster—i.e., to increment the C(S,T) table associated with the cluster by the joint phrase counts from the new pair. Then, the S-centroid vector associated with the chosen cluster is recomputed. All other clusters are left unchanged. The second strategy is to increase the number of clusters to accommodate the new data, without changing the previously defined clusters. To combine these strategies, one may define a distance threshold T between J-vectors. If the distance between the new document pair and the nearest cluster is less than T, the new document pair is assigned to the nearest cluster; otherwise, it is given its own, new cluster (to which future newly collected document pairs may also be assigned).

Finally, new data gathered from the Internet or from recently performed translations can be used in a rescoring step, by training new mappings for translation on them and using these new mappings to rescore translation hypotheses output by the decoder. In this case, dynamic adaptation is carried out not by changing the subspace used to perform the initial decoding, but by using information from the newly gathered data for rescoring.

Two key aspects of the invention are the construction of the bilingual sublanguage space and the way in which a source text unit is assigned to a location in that space. A particularly interesting alternative embodiment of the invention is one in which the construction of the bilingual sublanguage space involves a form of dimensionality reduction such as Principal Component Analysis (PCA), Linear Discriminative Analysis (LDA), or Independent Component Analysis (ICA). For instance, one could use S-vectors derived from the aligned phrase-pair counts to define the space. First, an S-vector would be computed from the source-language portion of each training document pair. The collection of S-vectors (D altogether, given D document pairs) would then undergo dimensionality reduction, yielding a space of dimension L (where L is considerably less than D). When decoding occurs, the source text unit is projected into the space of dimension L. Distances from the source text unit to the D documents are calculated in this space, and used to calculate the adapted model from the counts associated with the document pairs as described above. Alternatively, dimensionality reduction could be carried out on the J-vectors.

Another interesting embodiment is one in which the space is associated with a model that gives the probability of generating word sequences in the source language. This could be achieved, for instance, by means of a minor modification to the current embodiment, in which the source-language portions of the documents associated with each cluster would be used to train a statistical language model for each cluster. Given a similarity measure between the source text unit and the clusters, and an interpolation function for a source language model based on the similarity measure, the system would search for the point in the space whose interpolated source-language model had the highest conditional probability of generating the source text unit.

The invention claimed is:

1. A method for statistical machine translation using a bilingual sublanguage space, said method comprising;
   constructing a bilingual sublanguage space by defining a similarity measure between source text and a plurality of joint count tables, each of which corresponding to one or more than one bilingual document pair,
   identifying a translation unit to be translated from a source language to a target language,
   defining a source text unit, where said source text unit comprises said translation unit, and
   mapping said source text unit into a weighted combination of the joint count tables, such that joint count tables corresponding to source language of the bilingual document pairs that are more similar to the source text unit are assigned greater weights, and joint count tables corresponding to source language of the bilingual document pairs that are more dissimilar from the source text unit are assigned lower weights,
   wherein the joint count tables are used for carrying out statistical machine translation of said translation unit according to the respective weights.

2. The method of claim 1:
   where said defining a source text unit is done by using an automatic text segment boundary detector;
   where carrying out the translation comprises using the joint count tables to decode said translation unit according to the respective weights;
   where constructing the bilingual sublanguage space further comprises clustering D bilingual document pairs into K clusters, where said each of the D bilingual document pairs are identified by a J vector and each of said K clusters are identified by a J centroid, and computing a joint count table for each cluster; or
   where constructing the bilingual sublanguage space further comprises clustering D bilingual document pairs into K clusters, with said each of the D bilingual document pairs identified by a J vector and each of said K clusters identified by a J centroid, and computing a joint count table and an S centroid for each cluster, where said S centroid is used in obtaining a similarity measure between an arbitrary source text unit and the clusters.

3. The method of claim 1 where constructing the bilingual sublanguage space comprises:
   identifying more than one bilingual document pairs, each comprising a source language portion having a source language sequence and a target language portion having a target language sequence,
   aligning the source language sequence with the appropriate target language sequence, and
   constructing each of the plurality of joint count tables for its corresponding one or more than one bilingual document pair.

4. The method of claim 3 where:
   aligning is done in a first and a second pass, said first pass being a word alignment and a second pass being a phrase alignment on the basis of the word alignment;
   mapping the source text further comprises calculating a similarity number, using said similarity number to calculate weights associated with each bilingual document pairs, and building an interpolated joint count table using said calculated weights; or
   constructing the bilingual sublanguage space further comprises the additional step of constructing a phrase table of conditional probabilities from the interpolated joint count table.

5. The method of claim 1 further comprising;
   providing a language model component adapted to the source text unit;
   providing a language model component adapted to the source text unit by selecting one or more bilingual document pairs whose source-language portion is similar to the source text unit, and estimating the language model based on the target language portion of said selected bilingual document pair, thereby adapting said language model;
   providing a language model component adapted to the source text unit by estimating the language model based on the target language portions of clusters of said bilingual document pairs, in dependence on the measure of similarity between the clusters and the source text unit; or
   providing a language model component adapted to the source text unit by: clustering the collection of bilingual document pairs to assemble document pairs that similarly translate aligned words or aligned phrases of the document pairs; defining a measure of similarity between an arbitrary source text unit and each of the clusters in dependency on translation usages; and associating a language model in the target language with each of the clusters.

6. The method of claim 1 wherein carrying out the translation of said translation unit further comprises:
   performing two steps, with the first step outputs most probable translation hypotheses for the translation unit, and the second step uses a set of information sources to assign new probability scores to the translation hypotheses;

performing two steps, with the first step outputs most probable translation hypotheses for the translation unit, and the second step uses a set of information sources different than a set of components used in the first step to assign new probability scores to the translation hypotheses;

performing two steps, with the first step outputs most probable translation hypotheses for the translation unit, and the second step uses the bilingual sublanguage space to assign new probability scores to the translation hypotheses; or performing two steps, with the first step outputs most probable translation hypotheses for the translation unit, and the second step uses the bilingual sublanguage space to assign new probability scores to the translation hypotheses, wherein the bilingual sublanguage space is not used in the first step.

7. A method for statistical machine translation using a bilingual sublanguage space, said method comprising;

constructing a bilingual sublanguage space by defining a similarity measure between source text and a plurality of joint count tables, each of which corresponding to one or more than one bilingual document pair, identifying a translation unit to be translated from a source language to a target language, defining a source text unit, where said source text unit comprises said translation unit, mapping said source text unit into a weighted combination of the joint count tables where joint count tables corresponding to source language of the bilingual document pairs that are more similar to the source text unit are assigned greater weights, and joint count tables corresponding to source language of the bilingual document pairs that are more dissimilar from the source text unit are assigned lower weights, constructing a translation model for the translation unit by combining statistics from the weighted combination of joint count tables the translation model comprising one or more than one component from a group comprising; forward phrase translation model, backward phrase translation model, language model, distortion model, and sentence length model, and carrying out translation of said translation unit by statistical machine translation according to said translation model.

8. The method of claim 7 further comprising:

estimating weights to assign to said one or more than one components where said weights are adapted to said source text unit, and assigning weights to each component, estimating weights to assign to said one or more than one components, which is done by means of an estimation procedure performed on a development corpus, estimating weights to assign to said one or more than one components by means of an estimation procedure performed on a development corpus, where said development corpus is selected based on its similarity to said source text unit; or estimating weights to assign to said one or more than one components by means of an estimation procedure performed on a development corpus, where said development corpus is selected based on its similarity to said source text unit, comprises;

obtaining one or more than one development bilingual document pair having a source sublanguage portion and a target portion, selecting one or more than one development bilingual document pair whose source sublanguage portion is similar to the source text unit, assigning weights to one or more than one component for said selected source sublanguage portion, decoding said source sublanguage portion of the development bilingual document pair according to assigned weights to obtain a test target portion, comparing said test target portion to the target portion of the developmental bilingual document pair, modifying said weights until the test target portion is similar to the target portion of the developmental bilingual document pair, sending said modified weights to a decoder.

9. A method of claim 7 where;

decoding said translation unit produces one or more translation hypotheses, and rescoring said translation hypotheses according to said weights.

10. A method for constructing a statistical machine translation system that adapts translation according to context, the method comprising:

obtaining a collection of bilingual document pairs in electronic format, each comprising a source language portion having a source language sequence and a target language portion having a target language sequence:

identifying translations within the bilingual document pairs by word alignment or phrase alignment; and constructing at least one of: an adaptive language model that includes a language model in the target language associated with each of a plurality of clusters of the bilingual document pairs, the bilingual document pairs being clustered by similarity of translation usage; and a bilingual sublanguage space constructed by:

constructing a joint count table for each bilingual document pair, or for each cluster of the bilingual document pairs that assemble document pairs that translate the aligned words or aligned phrases similarly, computing conditional probabilities from each joint count table, and defining a similarity measure to map an arbitrary source text unit to a weighted combination of the joint count tables, where joint count tables corresponding to source language of the bilingual document pairs that are more similar to the source text unit are assigned greater weights, and joint count tables corresponding to source language of the bilingual document pairs that are more dissimilar from the source text unit are assigned lower weights, whereby the statistical machine translation system is adapted to apply at least one of the adaptive language models, or the weighted combination of the tables to carry out translation of a translation unit based on similarity of the source text unit associated with the translation unit to the source document pairs, or clusters.

11. The method of claim 10 further comprising providing program instructions for defining a source text unit and a translation unit, in at least one of the following ways:

by extracting the source text unit and translation unit from a source text to be translated;

by extracting the source text unit and translation unit from a source text to be translated, the source text unit including the translation unit;

by extracting the source text unit and translation unit from a source text to be translated, the source text unit including the translation unit and available meta-information;

by extracting the source text unit and translation unit from a source text to be translated, the source text unit including the translation unit which comes from a first web-page, and text from one or more than one web-pages linked to the first web-page;

by extracting the source text unit and translation unit from a source text to be translated, the source text unit being larger than the translation unit;

by extracting the source text unit and translation unit from a source text to be translated, the source text unit including the translation unit and sentences before and after the translation unit;

by extracting the source text unit and translation unit from a source text to be translated, the source text unit being larger than the translation unit, with different parts each assigned weights based on their relevance to the translation unit;

by extracting the source text unit and translation unit from a source text to be translated, the source text unit including the translation unit symmetrically;

by extracting the source text unit and translation unit from a source text to be translated, the source text unit including the translation unit asymmetrically;

by extracting the source text unit and translation unit from a source text to be translated, the source text unit including the translation unit and a weighted window around the translation unit; or by extracting the source text unit and translation unit from a source text to be translated using an automatic text segment boundary detector.

12. The method of claim 10, where constructing the bilingual sublanguage space further comprises:

clustering the bilingual document pairs into clusters, where said each of the bilingual document pairs are identified by a J vector and each of said clusters are identified by a J centroid, and computing a joint count table for each cluster;

clustering the bilingual document pairs into clusters, with said each of the bilingual document pairs identified by a J vector and each of said clusters identified by a J centroid, and computing a joint count table and an S centroid for each cluster, where said S centroid is used in obtaining a similarity measure between an arbitrary source text unit and the clusters;

clustering the bilingual document pairs into clusters in accordance with similarity of translation usage within the bilingual document pairs, where said each of the bilingual document pairs are identified by a J vector and each of said clusters are identified by a J centroid, and computing a joint count table for each cluster;

clustering the bilingual document pairs into clusters in accordance with similarity of translation usage within the bilingual document pairs, where said each of the bilingual document pairs are identified by a J vector and each of said clusters are identified by a J centroid, and computing a joint count table and an S centroid for each cluster, where said S centroid is used in obtaining a similarity measure between an arbitrary source text unit and the clusters.

13. The method of claim 10, where the adaptive language model is constructed by:

training a language model for each cluster on all the target-language documents in that cluster;

training a language model for each cluster on all the target-language documents in that cluster, the cluster assembling bilingual document pairs into clusters in accordance with similarity of translation usage within the bilingual document pairs;

training a language model for each cluster on all the target-language documents in that cluster along with additional unilingual target-language texts;

training a language model for each cluster on all the target-language documents in that cluster along with an additional of unilingual target-language texts obtained from a large collection of documents using information retrieval techniques; or providing program instructions for estimating the language model based on the target language portions of said bilingual document pairs in the clusters, in dependence on the measure of similarity between the cluster and the source text unit, thereby permitting the language model to be adapted.

14. A statistical machine translation system that adapts translation according to context, the system comprising a processor with a memory having program instructions for:

defining a source text unit and a translation unit with respect to a source text to be translated;

constructing a specialized translation mapping for the source text unit, the specialized translation mapping provided by adapting a language model of the system, a translation model of the system, or both; and using the specialized translation mapping to carry out the translation of the translation unit;

where, if the language model is adapted, the system further comprises program instructions encoding an adaptive language model that includes a language model in the target language associated with each of a plurality of clusters of the bilingual document pairs, and where, if the translation model is adapted, the system further comprises program instructions for:

encoding a plurality of joint count tables, each associated with a respective bilingual document pair or cluster of bilingual document pairs that translate the aligned words or aligned phrases similarly; and defining a similarity measure to map an arbitrary source text unit to a weighted combination of the joint count tables, where joint count tables corresponding to source language of the bilingual document pairs that are more similar to the source text unit are assigned greater weights, and joint count tables corresponding to source language of the bilingual document pairs that are more dissimilar from the source text unit are assigned lower weights;

whereby the machine translation system is adapted to apply at least one of the adaptive language models, or the weighted combination of the tables, to carry out translation of a translation unit based on similarity of the source text unit associated with the translation unit to the source document pairs, or clusters.

15. The system of claim 14 further comprising program instructions for defining a source text unit and a translation unit, in one of the following ways:

by extracting the source text unit and translation unit from a source text to be translated;

by extracting the source text unit and translation unit from a source text to be translated, the source text unit including the translation unit;

by extracting the source text unit and translation unit from a source text to be translated, the source text unit including the translation unit and available meta-information;

by extracting the source text unit and translation unit from a source text to be translated, the source text unit including the translation unit which comes from a first web-page, and text from one or more than one web-pages linked to the first web-page;

by extracting the source text unit and translation unit from a source text to be translated, the source text unit including more text than the translation unit, with different parts each assigned weights based on their relevance to the translation unit;

by extracting the source text unit and translation unit from a source text to be translated, the source text unit including more text than the translation unit;

by extracting the source text unit and translation unit from a source text to be translated, the source text unit including the translation unit and text before and after the translation unit;

by extracting the source text unit and translation unit from a source text to be translated, the source text unit including the translation unit symmetrically;

by extracting the source text unit and translation unit from a source text to be translated, the source text unit including the translation unit asymmetrically;

by extracting the source text unit and translation unit from a source text to be translated, the source text unit including the translation unit and a weighted window around the translation unit; or by extracting the source text unit and translation unit from a source text to be translated using an automatic text segment boundary detector.

16. The system of claim 14, where the adaptive language model comprises:

a plurality language models independently trained for each cluster on all the target-language documents in that cluster;

a plurality language models independently trained for each cluster on all the target-language documents in that cluster, the cluster assembling bilingual document pairs into clusters in accordance with similarity of translation usage within the bilingual document pairs;

a language model independently trained for each cluster on all the target-language documents in that cluster along with additional unilingual target-language texts; or program instructions for estimating a language model based on the target language portions of said bilingual document pairs in the clusters, in dependence on the measure of similarity between the cluster and the source text unit, thereby permitting the language model to be adapted in different instances.

17. The system of claim 14, where the translation model further comprises:

a model capable of estimating a conditional probability of a target word sequence, given a translation unit and a score related to said conditional probability; or comprising one or more than one component from a group comprising: a forward phrase translation model, a backward phrase translation model, a language model, distortion model, and a sentence length model.

18. The system of claim 14 further comprising program instructions for dynamically constructing a development corpus based on its similarity to the source text unit.

19. The system of claim 14 further comprising program instructions for carrying out the translation of said translation unit by:

decoding said translation unit to produce one or more than one translation hypotheses;

decoding said translation unit to produce one or more than one translation hypotheses and a score;

decoding said translation unit to produce one or more than one translation hypotheses while assigning greater weights to language models or language model counts associated with clusters that are more similar to the source text unit according to a similarity measure to provide an adapted language model for a given source text unit;

performing two steps, with the first step outputs most probable translation hypotheses for the translation unit, and the second step uses a set of information sources to assign new probability scores to the translation hypotheses;

performing two steps, with the first step outputs most probable translation hypotheses for the translation unit, and the second step uses a set of information sources different than a set of components used in the first step to assign new probability scores to the translation hypotheses;

performing two steps, with the first step outputs most probable translation hypotheses for the translation unit, and the second step uses the bilingual sublanguage space to assign new probability scores to the translation hypotheses; or performing two steps, with the first step outputs most probable translation hypotheses for the translation unit, and the second step uses the bilingual sublanguage space to assign new probability scores to the translation hypotheses, wherein the bilingual sublanguage space is not used in the first step.

20. The system of claim 14 wherein the clusters are sets of the bilingual document pairs that are clustered by similarity of translation usage.

* * * * *